United States Patent
Crawley

(10) Patent No.: US 10,014,695 B2
(45) Date of Patent: Jul. 3, 2018

(54) CONTROL AND CURRENT MEASUREMENT FUNCTION FOR BATTERY CHARGING, PROTECTION AND FUEL GAUGE COULOMB COUNTING

(71) Applicant: Fairchild Semiconductor Corporation, San Jose, CA (US)

(72) Inventor: Philip J. Crawley, Oceanside, CA (US)

(73) Assignee: Fairchild Semiconductor Corporation, San Jose, CA (US)

(*) Notice: Subject to any disclaimer, the term of this patent is extended or adjusted under 35 U.S.C. 154(b) by 201 days.

(21) Appl. No.: 14/606,689

(22) Filed: Jan. 27, 2015

(65) Prior Publication Data

US 2015/0214755 A1 Jul. 30, 2015

Related U.S. Application Data

(60) Provisional application No. 61/932,029, filed on Jan. 27, 2014.

(51) Int. Cl.
*H02J 7/00* (2006.01)

(52) U.S. Cl.
CPC ............ *H02J 7/0013* (2013.01); *H02J 7/007* (2013.01); *H02J 7/0068* (2013.01)

(58) Field of Classification Search
CPC .................................................. H02J 7/0013
USPC ....................................................... 320/112
See application file for complete search history.

(56) References Cited

U.S. PATENT DOCUMENTS

| | | | | |
|---|---|---|---|---|
| 5,684,663 A * | 11/1997 | Mitter | .................... | H02H 9/025 361/100 |
| 5,796,238 A * | 8/1998 | Hiratsuka | .......... | G01R 31/3624 320/112 |
| 6,025,694 A * | 2/2000 | Mercke | ................ | H02J 7/0004 320/106 |
| 6,031,302 A * | 2/2000 | Levesque | .............. | H02J 7/0031 307/125 |
| 6,369,576 B1 * | 4/2002 | Matthews | .......... | G01R 19/0092 320/106 |

(Continued)

FOREIGN PATENT DOCUMENTS

EP 1533882 B1 5/2005

*Primary Examiner* — Drew A Dunn
*Assistant Examiner* — Jerry D Robbins
(74) *Attorney, Agent, or Firm* — Brake Hughes Bellermann LLP

(57) ABSTRACT

In a general aspect, a battery pack can include a battery configured to supply power to a connected device and to receive re-charge power from a charger circuit. The battery pack can further include a current modulating circuit configured to modulate current of the battery between first and second supply terminals of the battery pack. The battery pack can also include a controller configured to provide voltage protection of the battery pack and charge current control of the battery using the current modulating circuit. The controller can be configured, while the battery is being charged, to compare, at the battery pack, a charge voltage setpoint of the battery pack with a desired charging voltage; modify, at the battery pack, the charge voltage setpoint to achieve the desired charging voltage; and provide the modified charge voltage setpoint from the battery pack to a connected device.

22 Claims, 8 Drawing Sheets

(56) References Cited

U.S. PATENT DOCUMENTS

| | | | | |
|---|---|---|---|---|
| 7,495,416 B2* | 2/2009 | Sato | ................. | H02J 7/0031 |
| | | | | 320/134 |
| 7,528,574 B1* | 5/2009 | Adkins | ................. | H01M 10/44 |
| | | | | 320/128 |
| 7,626,360 B2* | 12/2009 | Melanson | ............. | H02J 7/0031 |
| | | | | 320/127 |
| 7,675,266 B2* | 3/2010 | Nakano | ................. | H01M 10/44 |
| | | | | 320/106 |
| 7,830,121 B2* | 11/2010 | Sasaki | ................. | H02J 7/0031 |
| | | | | 320/106 |
| 8,638,065 B2* | 1/2014 | Sakakibara | ......... | H01M 10/441 |
| | | | | 307/66 |
| 9,231,283 B2* | 1/2016 | Ikeuchi | ................. | H01M 10/44 |
| 2015/0207343 A1* | 7/2015 | Zhai | ................. | H02M 3/158 |
| | | | | 320/112 |

\* cited by examiner

CONTROL AND CURRENT MEASUREMENT FUNCTION FOR BATTERY CHARGING, PROTECTION AND FUEL GAUGE COULOMB COUNTING

RELATED APPLICATION

This application claims the benefit of priority to U.S. Provisional Patent Application Ser. No. 61/932,029, filed on Jan. 27, 2014, which is incorporated by reference herein in its entirety.

BACKGROUND

FIG. 1 illustrates an existing electronic device system 100 including a rechargeable energy source such as a rechargeable battery pack 101. The battery pack 101 can include a rechargeable energy storage device, such as a battery 102, protection circuits 106, and fuel gauge electronics 109. During battery sourced operation, the battery 102 can supply energy to operate electronics 105 of a connected device such as an electronic device 103. The electronic device 103 can include charger electronics 108 and load electronics 105 such as processors, memory, input devices and output devices. The electronic device 103 can include protection circuits 104 to protect the mobile device electronics 105 from harm caused by improper supply voltage, improper supply current, or combinations thereof. The battery 102 or battery pack 101 can include protection circuits 106 to protect the battery from harmful operation such as short circuit operation or over-current operation. As a rechargeable energy source, an adapter 107 can be coupled to the electronic device 103 to provide operating energy and recharge energy for the energy source 102. During charging operations, both the device electronics 105 and the battery pack 101 can include protection circuits 104, 106 to protect each device from harmful charging conditions such as, but not limited to, charging over-voltage and charging over-current. In order to provide the above protection and functions, several resistive elements can be implemented in the supply path of the electronic device 103 and each resistive element can use energy that could otherwise extend the useable charge life of the battery 102.

OVERVIEW

Apparatus and methods for charging, controlling, or protecting an energy storage device of an electronic device are provided. In an example, a battery pack having a first supply terminal and a second supply terminal can include a battery configured to supply power to a connected device and to receive re-charge power from a charger circuit, means for modulating current of the battery between the first supply terminal and the second supply terminal, and a controller configured to provide voltage protection of the battery pack, fuel gauge information of the battery and charge current control of the battery using the means for modulating current of the battery and the controller configured to provide charge voltage setpoint information to a connected device.

This overview is intended to provide a partial summary of the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, apparatus and methods for improving battery or energy source re-charging without diminishing protection for the energy source or for the electronic device powered by the energy source. In certain examples, power dissipation during recharging unexpected improved such that the apparatus and methods allow for faster more complete charging with much better energy efficiency.

Figure 1:
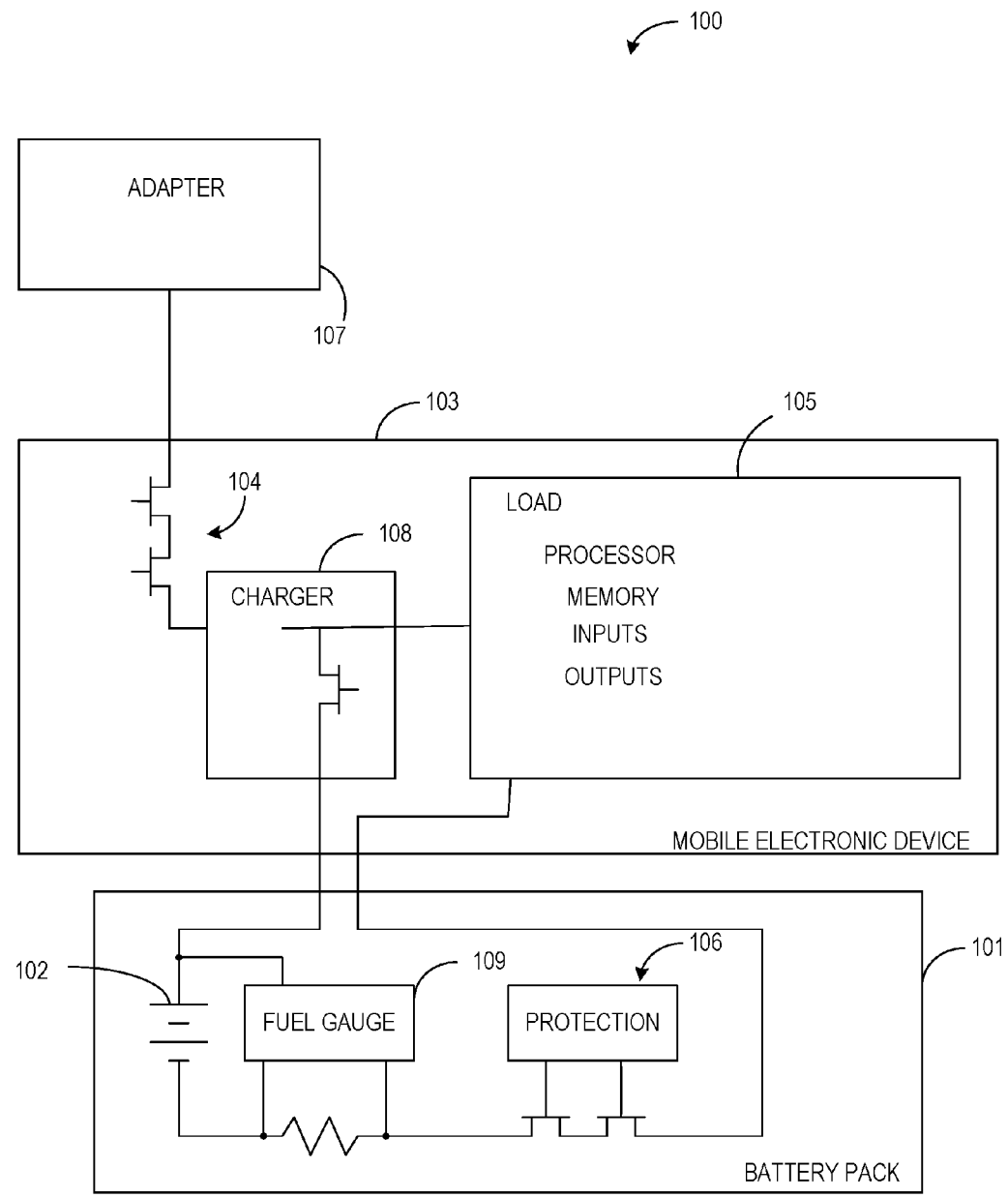
FIG. 1 illustrates an existing charging system for a mobile electronic device.
Figure 2:
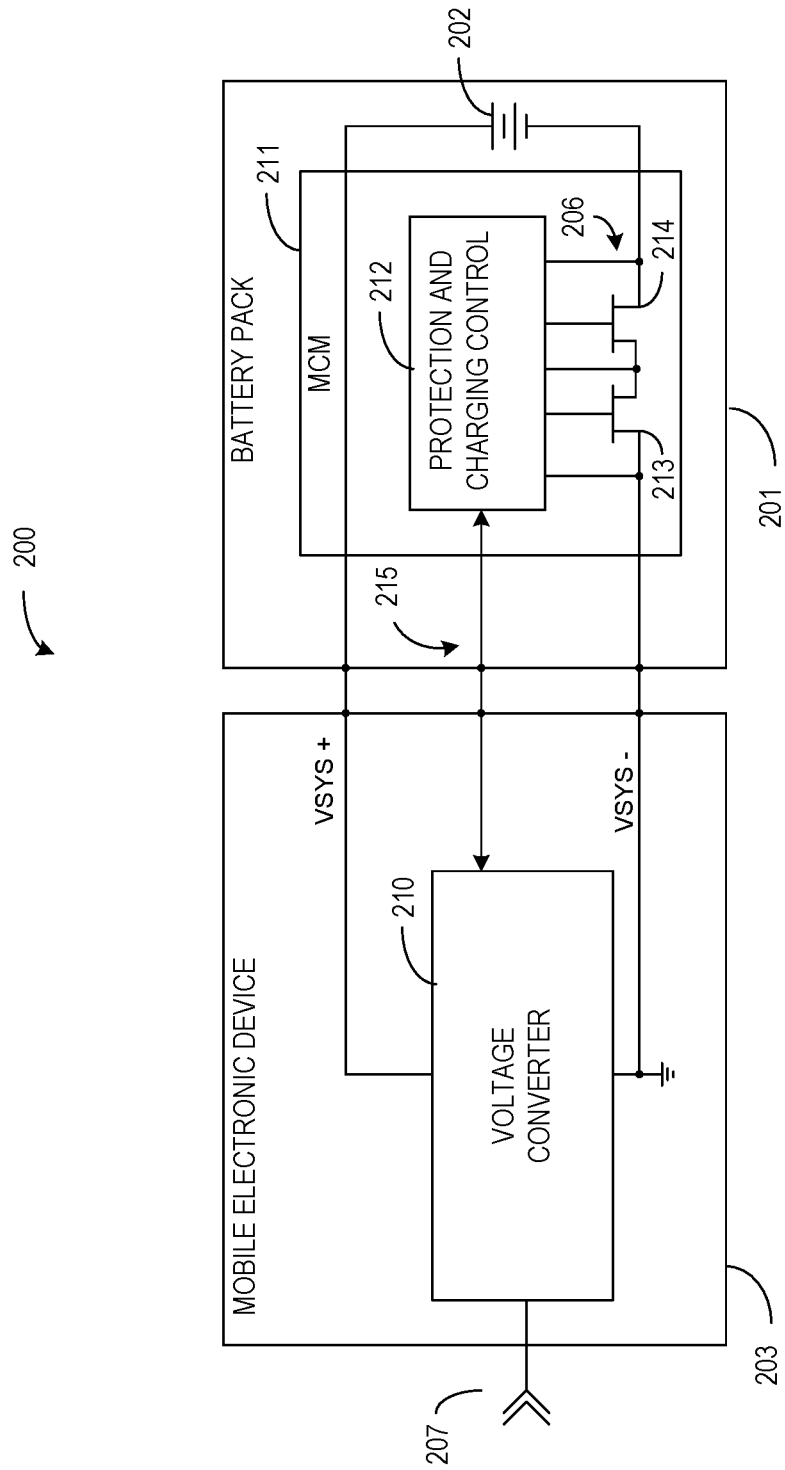
FIG. 2 illustrates generally an example battery pack system for a mobile electronic device.

FIG. 2 illustrates generally an example electronic device system 200 that includes an electronic device 203 and a rechargeable energy storage device, or battery pack 201. In certain examples, the battery pack is separate component from the electronic device and is configured with one or more supply terminals and a mechanical latch that allows it to be easily separated from or removed from the electronic device. In certain examples, the electronic device 203 can include a charger adapter connector 207 and a voltage converter 210. The battery pack 201 can include a multi-chip module 211 and a battery 202. The MCM 211 can include a controller 212 and a protection circuit 206 including one or more transistors 213, 214. Compared to the system 100 of FIG. 1, the example system 200 has fewer components connected in series between the battery pack 201 and the electronic device 203. The reduction in components can allow the battery 202 of the battery pack 201 to charge more quickly and more completely than the system 100 of FIG. 1. In addition, the battery pack 201 can provide more useable energy between re-charges with the configuration of FIG. 2 compared to the system of FIG. 1. Furthermore, in some examples, the configuration of FIG. 2 can still provide protection for the electronic device 203 and the battery pack 201.

In certain examples, the electronic device 203 can include, but is not limited to, a mobile electronic device such as a person digital assistant, a tablet, a portable computer or a cellphone such as a smartphone. In the illustrated examples, only certain portions of the electronic device 203 associated with power delivery are shown. It is understood that the illustrated electronic devices can include various processors, sensors, transducers, input devices, displays and communication circuits in addition to the illustrated power delivery circuits. In certain examples, the power delivery circuits of the electronic device can include terminals for connecting to a battery pack that includes a rechargeable battery or rechargeable capacitor, and the battery pack can include terminals for electrically coupling to the electronic device.

In certain examples, the electronic device system 200 can include a mobile electronic device 203 and a battery pack 201 for providing operating power (VSYS+, VSYS−) to the mobile electronic device 203. The mobile electronic device 203 can include a charge adapter connector 207 for coupling to an adapter for purposes of providing operating power (VSYS+, VSYS−) for the electronic device 203 and for charging a battery 202 of the battery pack 201. In certain examples, the electronic device 203 can include a voltage regulator or voltage converter 210 for providing a charge voltage. In certain examples, the mobile electronic device 203 does not include a typical protection circuit for providing charge current and/or charge voltage protection. In certain examples, the mobile device does not include a current limiter for battery charging (CCCV control).

In certain examples, the battery pack 201 can include an MCM 211 and an energy storage device such as a rechargeable battery 202 or a rechargeable capacitor, for example. In certain examples, the MCM 211 can include a controller 212 and a battery pack protection circuit 206. In some examples, the battery pack controller 212 can include a communication interface 215 such as a single wire serial interface or a two-wire or multi-wire communication interface such as an I2C compatible interface. The battery pack controller 212 can provide or communicate one or more commands as well as status information via the communication interface 215 to a controller (not shown) of the mobile electronic device 203. In certain examples, the battery pack controller 212 can communicate fuel gauge information, charge and discharge protection, over-voltage and over-current protection, or combinations thereof using the communication interface 215.

In certain examples, the battery pack protection circuit 206 can include one or more switches such as transistors 213, 214. In certain examples, the battery pack protection circuit 206 can include at least two transistors 213, 214 coupled in series with the battery 202 between terminals of the battery pack 201. The battery pack controller 212 and the two transistors 213, 214 can provide several functions including, but not limited to, over-discharge voltage protection, over-charge voltage protection, over-discharge current protection, over-charge current protection, short circuit protection, current sense for fuel gauge, current limiter for constant current and/or constant voltage charging.

In some examples, the battery pack protection circuit 206 of the battery pack 201 can eliminate one or more protection transistors in the mobile electronic device 203 or charger adapter. The eliminated resistances can allow increased charging capacity the ability to use more of the available charge of the battery 202. It understood that although the examples herein are described with reference to a mobile electronic device, it is possible to apply the apparatus and methods to other electronic devices without departing from the scope of the present subject matter.

In certain examples, the battery pack controller 212 or MCM 211 can include registers for storing fuel gauge information. In certain examples, the battery pack controller 212 or MCM 211 can include memory for storing modelling information such as modelling information for the battery 202, the protection transistors 213, 214 or combinations thereof. In certain examples, the modelling information can be used to provide fuel gauge information indicative of the energy capacity of the battery 202. In some examples, the modelling information can be used to estimate electrical current based on voltage samples across various terminals of the protection transistors 213, 214 or voltage samples of other battery pack locations such as the battery voltage. This estimating capability can eliminate energy waste in the electronic device system 200. For example, in certain existing systems, a current sense resistor is included for making current measurements for fuel gauge information. In certain examples, the present system 200 can accurately measure current using the protection transistors 213, 214 of the battery pack 201, thus, eliminating the need for a current sense resistor and further reducing the power path resistance allowing more energy to be stored and used on the battery. As another example of stored energy savings, existing electronic devices often include a transistor between the battery and the device load to provide a current limiter for the battery charger, such as a constant-current, constant voltage battery charger. The present system can eliminate such a transistor resulting in reduced power path resistance.

As discussed briefly above, the battery pack 201 can include a communication interface 215 to connect the battery pack controller 212 with one or more other devices of the mobile electronic device 203. In certain examples, the communication interface 215 can provide status information of the battery pack 201 including, but not limited to, charging status, discharging status, temperature, as well as, protection information and alarms. In some examples, the communication interface 215 can be used to provide charge voltage setpoint information. The charge voltage setpoint information can be used to command the voltage converter 210 of the electronic device 203 to provide a particular output voltage to the battery pack 201 during a charging cycle. As discussed below, the charge voltage setpoint information can assist in controlling the charging cycle of the battery 202 or other energy storage device. The charge setpoint feedback provided by the communication interface 215 can assist in reducing stress of the charging components by allowing the battery to charge at a lower voltage when appropriate while also assisting in providing a fast recharge of the energy storage device. Unexpectedly, the charge voltage setpoint feedback has also allowed for more efficient charging as it allows for improved power dissipation during the charging cycle as show in FIG. 7.

Figure 3:
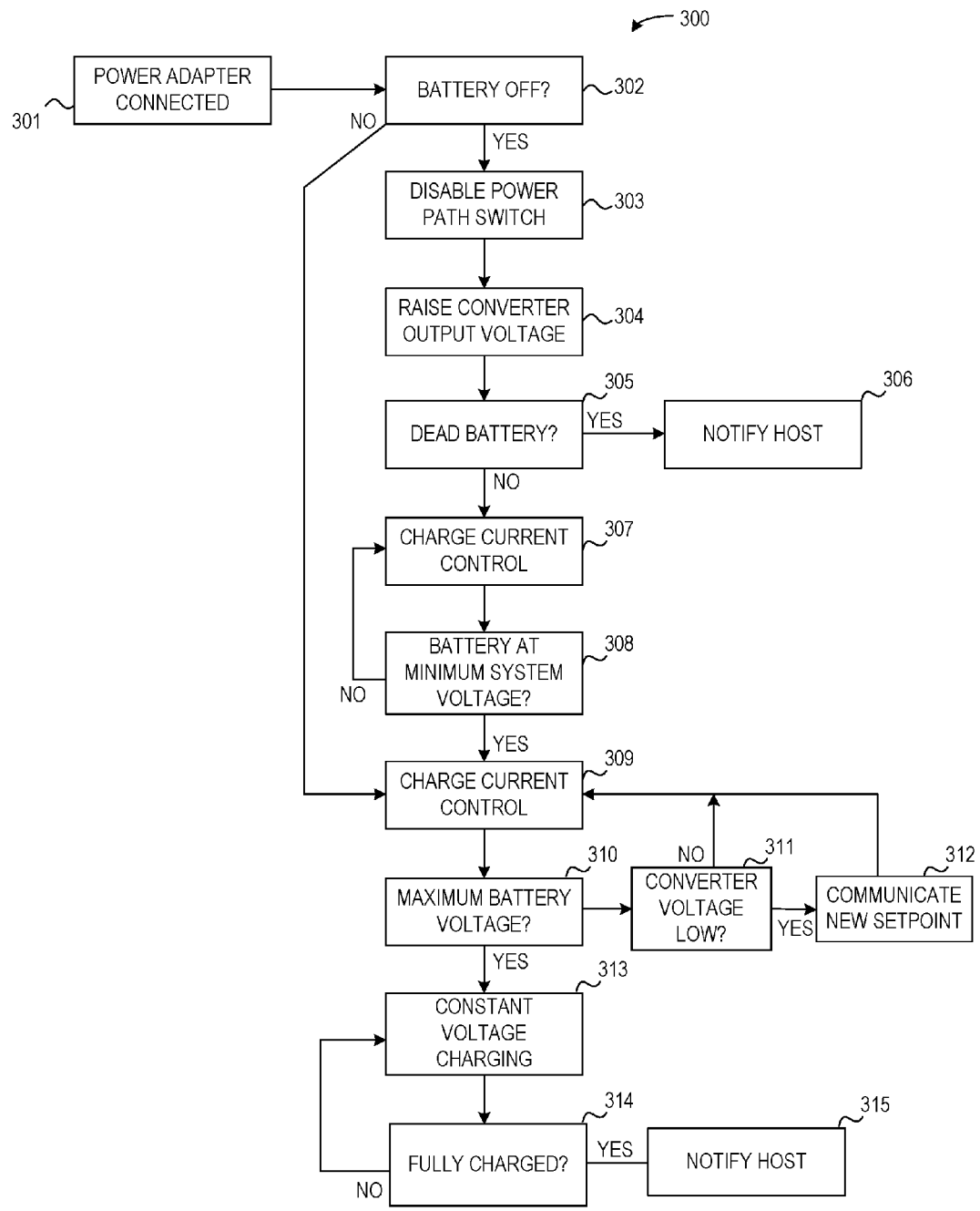
FIG. 3 illustrates generally and flowchart of an example method for charging a battery.

FIG. 3 illustrates generally and flowchart of an example method 300 for charging a battery. After connecting a charger or power adapter 301 to the mobile device, the method at can include detecting if the battery is switched off 302 or decoupled from the bus of the system. In certain examples, when the battery falls below a certain voltage, the battery is disconnected or turned off because the battery voltage can no longer sustain operation of the device. At 303, if the battery is turned off, any power path FET if there are any and if not already turned off can be turned off to assure that the battery is not coupled to the supply bus of the device. At 304, the converter, such as a buck converter, can be enabled to provide a first predetermined voltage to the supply bus. In certain examples, the first predetermined voltage can be a voltage capable of operating the device. At 305, a dead battery evaluation can be made and the host processor can be notified if the battery is dead 306. At 307, if the battery is not dead, the battery can be pre-charged using the MCM transistors in a current control mode of operation. At 308, battery voltage can be compared with a minimum battery voltage level. If the battery voltage is not at or above the minimum battery voltage level, the battery continues to pre-charge. At 309, if the battery has attained a minimum voltage level, the battery can continued to be charged in current mode to a maximum voltage at 310. If the battery has not reached the maximum voltage, the setpoint voltage of the converter can be evaluated, at 311, and can be modified at 312 to achieve the desired charge voltage. If the battery attains maximum voltage, the battery can be charged at a constant voltage 313 using the MCM transistors until a fully charged state is reached at 314. At 315, the host processor can be notified that the battery is fully charged. In certain examples, the MCM transistors can be used for both current sensing and voltage sensing during each step of the charging cycle. Existing system often include multiple sensing system, where each sensing system can only provide current and voltage sensing at certain times during the charging cycle. In some existing systems, a separate current sensing system and control loop are used to provide constant current charging. In certain examples of the present subject matter, the fuel gauge controller can provide processing and control signals for the MCM transistors and the converter.

Figure 4:
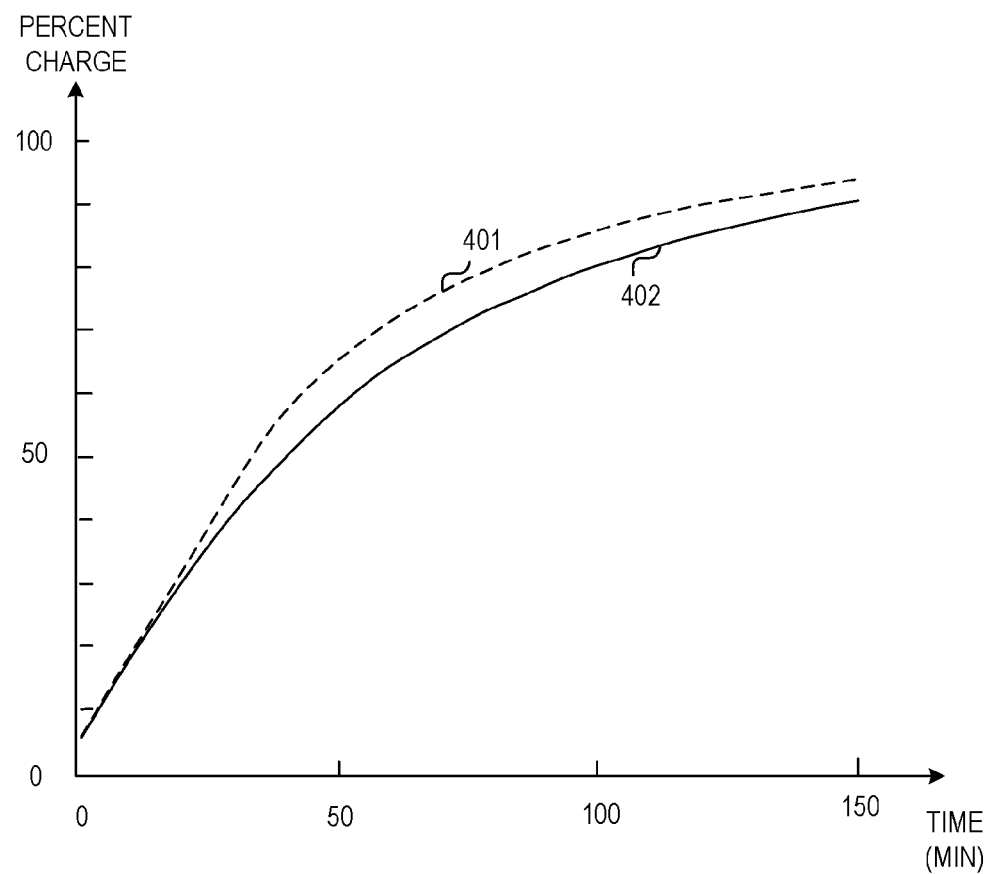
FIG. 4 illustrates generally an improved charging rate and fully charged level compared to some existing approaches.

In certain examples, the simplified circuitry of the present subject matter can result in less circuit resistance including less trace resistance, less current sense resistance, and less power path resistance. In some examples, trance resistance can be reduced by about 20 milliohms (mΩ). In some examples, current sense resistance can be reduced by about 10 mΩ. In some examples, elimination of a power path transistor can reduce power path resistance can by about 10 mΩ. FIG. 4 illustrates generally an improved charging rate 401 and fully charged level compared to some existing approaches 402. In certain examples, charging can be 18% faster from near zero charge to 50% charge. In certain examples, the reduced power path resistance can also allow more usable power to be stored and/or harvested from the battery. In some examples, a system according to the present subject matter can provide 4% more useable charge when compared to a system with 20 mΩ more power path resistance. In certain examples, where power path resistance is reduced by more than 20 mΩ more than 4% more charge can be available for use.

Figure 5:
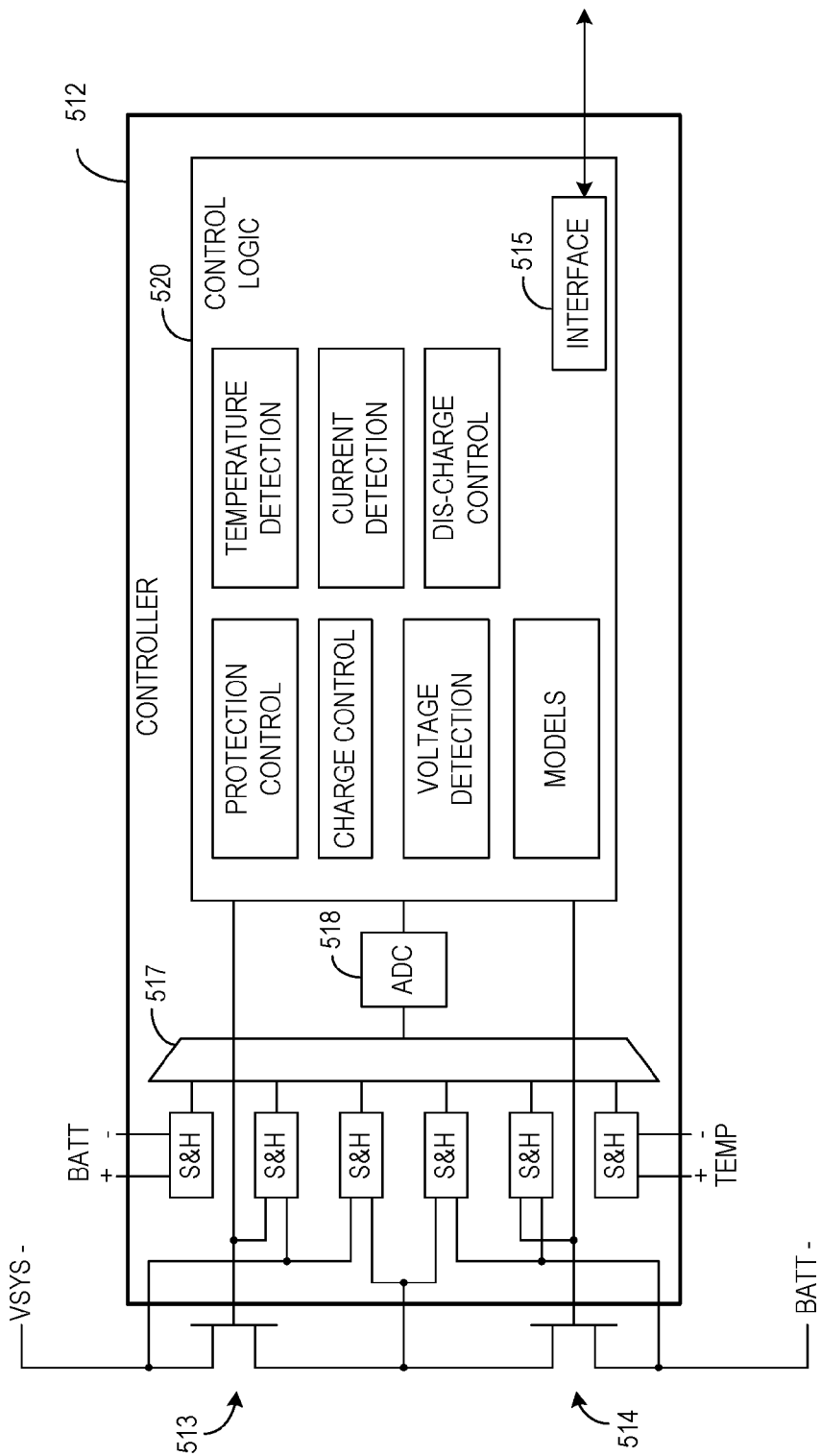
FIG. 5 illustrates generally an example current sense circuit for use in providing current information for an example battery pack system.

FIG. 5 illustrates generally an example battery pack controller 512 and protection transistors 513, 514. In certain examples, the battery pack controller 512 can include a multiplexer 517 and analog to digital converter (ADC) 518 for providing various sample voltages to control logic 520 of the battery pack controller 512. In some examples, the multiplexer 517 can include sample and hold circuits (S&H). In some examples, the sample and hold circuits (S&H) can be separate from the multiplexer 517. In certain examples, the control logic 520 can include logic for voltage detection, current detection, temperature detection, protection control, charge control, dis-charge control. In some examples, the control logic 520 can include a communication interface 515 for providing status information to the processor of the electronic device. In certain examples, the various sample voltages can include voltages associated with the battery, voltages associated with various sensors such as a battery pack temperature sensor (not shown), and voltages associated with the protection transistors 513, 514. In some examples, the various sample voltages can be used to estimate battery charge capacity for providing fuel gauge information.

In certain examples, the protection transistors 513, 514 can provide information for estimating current flow such as battery discharge current and battery charge current. In such an example, a model of one or more of the protection transistors can be stored in memory and can be used as a look-up table. The temperature sense information and the sampled voltages from the one or more protection transistors 513, 514 can be used as parameters to fetch proper model information for estimating the current passing through the protection transistors 513, 514. Using the protection and control transistors 513, 514 for current sensing can eliminate the need for a separate current sensor in the power path of the battery pack. Elimination of such an element can further reduce the resistance of the power path of the battery pack.

Figure 7:
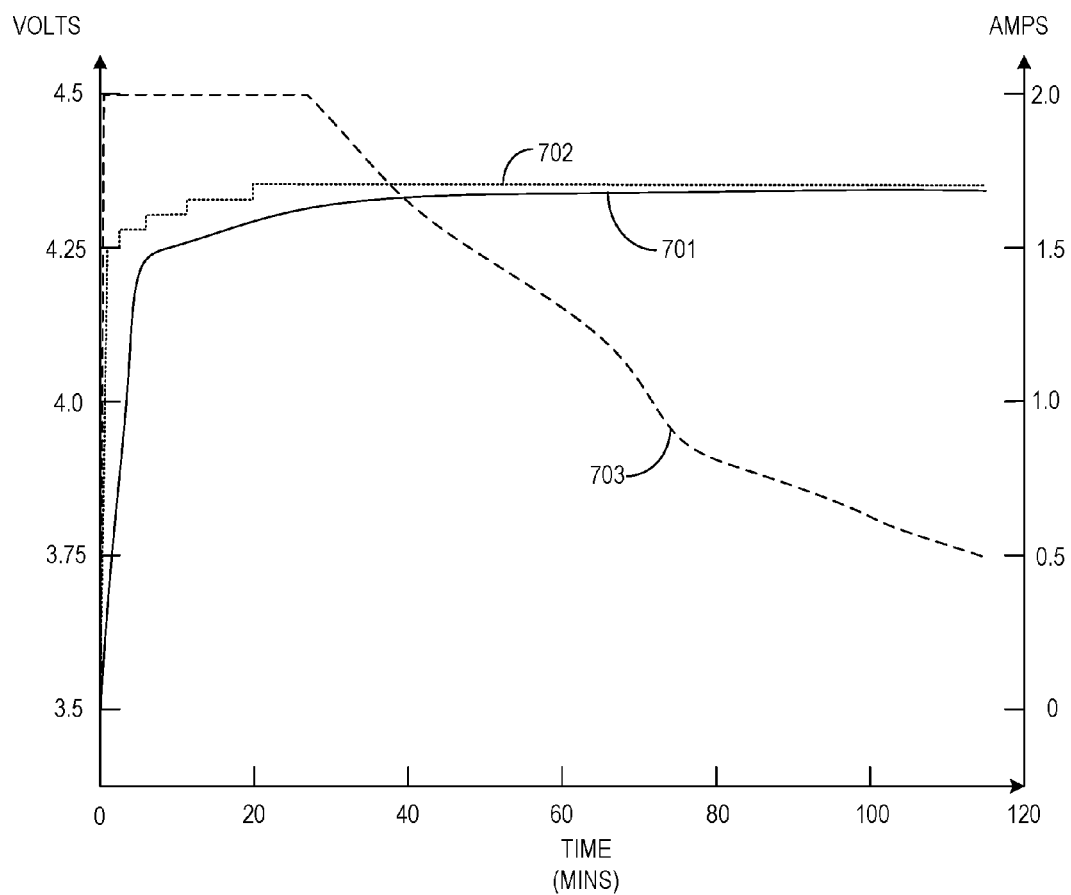
FIG. 7 illustrates generally improved charging characteristics associated with an example battery pack.

In some examples, the control logic 520 can provide charge voltage setpoint information to the electronic device processor or a voltage regulator or converter of the electronic device system. In such systems, once the battery pack detects and validates a connected charger, the voltage converter can be commanded or preset to provide a minimum charge voltage. The battery pack can begin re-charging at a constant current and a minimum voltage to accommodate fast, efficient charging of the battery. As the energy source, or battery, terminal voltage increases, the charge voltage setpoint can rise and the charge voltage setpoint information can be communicated to the voltage converter using the communication interface 515. When the energy source terminal voltage reaches a predetermined threshold, the battery pack controller 520 can change from constant current charging to constant voltage charging. The above example re-charging method is illustrated graphically in FIG. 7. FIG. 7 illustrates graphically the energy source or battery terminal voltage 701, the converter output voltage or battery pack terminal voltage 702 and the charge current 703.

Figure 6:
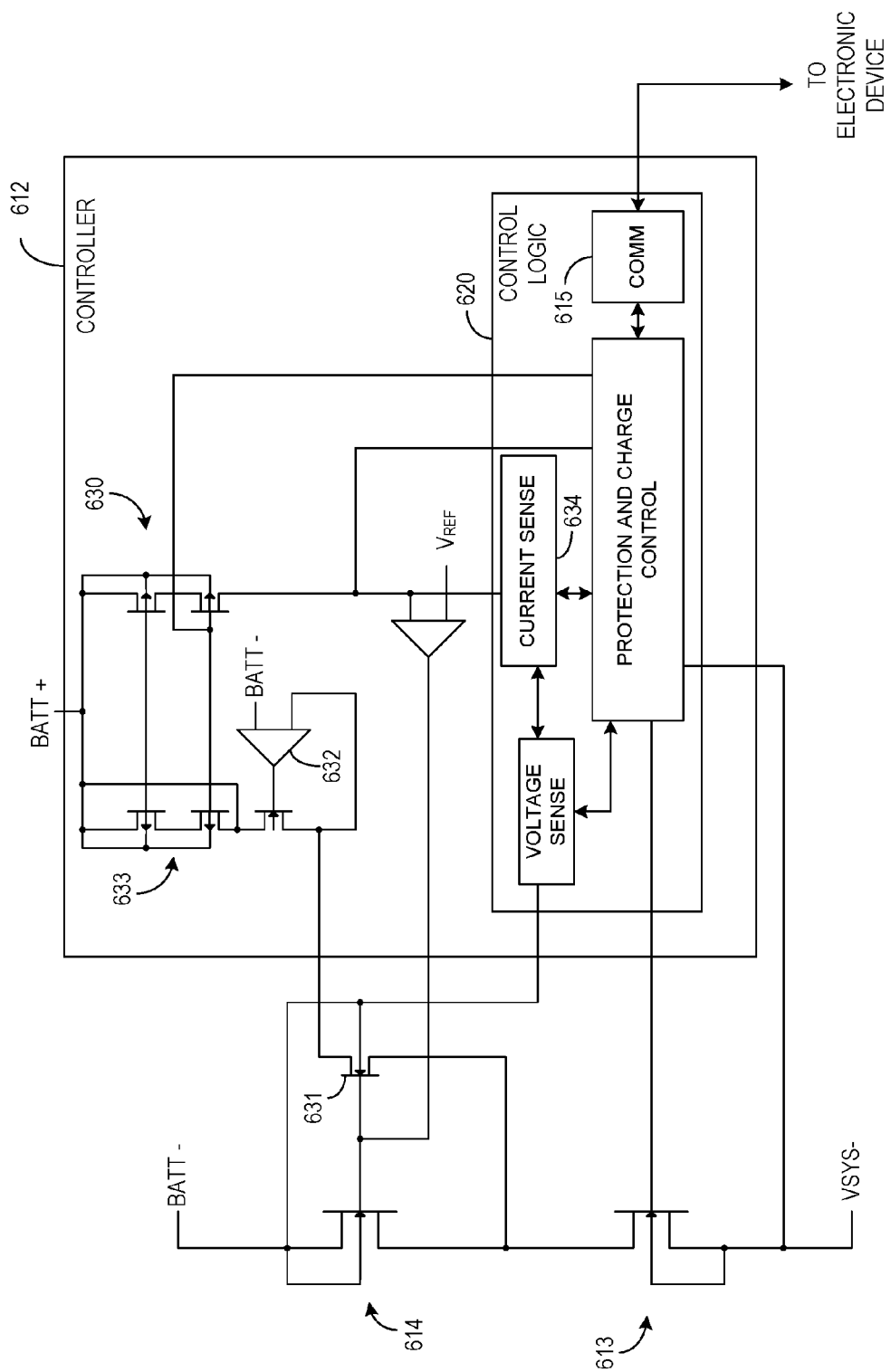
FIG. 6 illustrates generally an example current sense circuit for use in providing current information for an example battery pack system.

FIG. 6 illustrates generally an example battery pack controller 612 and protection transistors 613, 614 with an alternative current sense circuit. The example current sense circuit 630 uses a scaled duplicate transistor 631 driven at the same potential as one of the protection transistors 614 and then measured to estimate the current flow through the protection transistor 614. In certain examples, the alternative current sense circuit can include a voltage follower amplifier 632 to provide a gate-to-source voltage ($V_{gs}$) corresponding to the $V_{gs}$ of the protection transistor 614. A current mirror 633 can scale a sense current provided by the duplicate transistor 631 to provide a status current signal indicative of the current through the protective transistor 614. The status current signal can be provided to additional current sense logic 630 of the control logic 620 for monitoring, control input and alarm condition detection. In some examples, the status current signal can be converted to a status voltage signal using a resistor, for example, and the status voltage signal can be provided to the additional current sense logic 634 of the control logic 620 for monitoring, control input and alarm condition detection. Using the protection and control transistors 613, 614 for current sensing can eliminate the need for a separate current sensor in the power path of the battery pack. Elimination of such an element can further reduce the resistance of the power path of the battery pack. In addition to the additional current sense logic, the control logic can monitor various voltages including the battery voltage, the charge voltage and a temperature sensor (not shown). The control logic 620 can provide charge and discharge control and can protect against harmful conditions associated with battery operation of the electronic device and harmful conditions associated with charging of the battery as discussed above with regards to the example of FIG. 2.

In some examples, the control logic 620 can provide charge voltage setpoint information to the electronic device processor or a voltage converter of the electronic device system. In such systems, once the battery pack detects and validates a connected charger, the voltage converter can be commanded or preset to provide a minimum charge voltage. The battery pack can begin re-charging at a constant current and a minimum voltage to accommodate fast, efficient charging of the battery. As the energy source, or battery, terminal voltage increases, the charge voltage setpoint can rise and the charge voltage setpoint information can be communicated to the voltage converter using the communication interface 615. When the energy source terminal voltage reaches a predetermined threshold, the battery pack controller 612 can change from constant current charging to constant voltage charging. The above example re-charging method is illustrated graphically in FIG. 7. FIG. 7 illustrates graphically the energy source or batter terminal voltage 701, the converter output voltage or battery pack terminal voltage 702 and the charge current 703.

Figure 8:
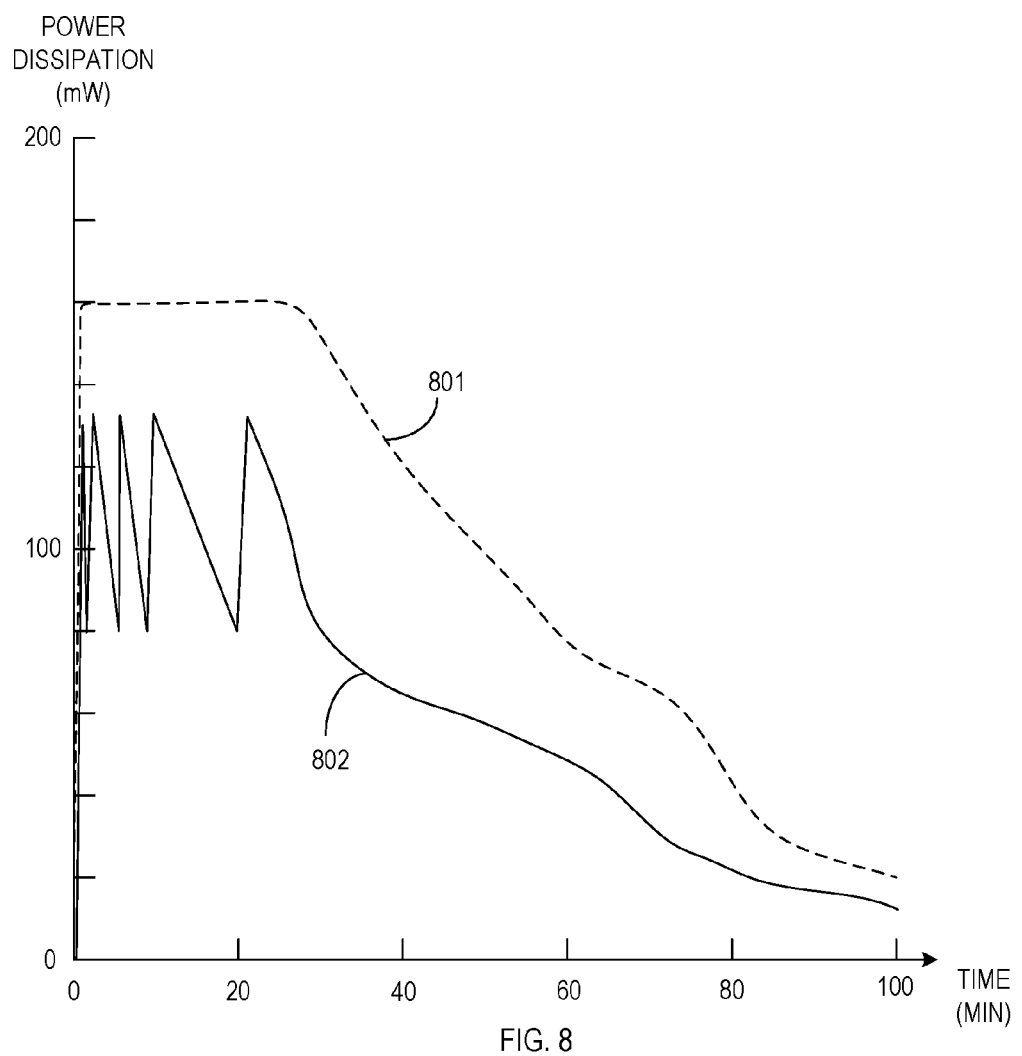
FIG. 8 illustrates unexpected improvement in charging power dissipation associated with an example battery pack.

As discussed briefly above, an unexpected result of trying to reduce the resistance of the power delivery path of an electronic device system, as discussed above with reference to FIG. 2, is improved power dissipation. One would expect that the combination of reduced power path resistance and the ability to charge at higher voltage would not provide any significant benefit. However, as shown in FIG. 8, the benefit of reducing the path resistance unexpectedly far outweighs the cost of having higher drive voltage across the combined power path and battery. FIG. 8 illustrates graphically a power distribution comparison between a traditional electronic device system 801 and an example electronic device system 802. The example system combines reduced power path resistance with voltage control during re-charging. The lower resistance and charge voltage control results in significant reduction in power dissipation as shown in FIG. 8.

In certain examples, the present subject matter provides architecture to use a single set of protection transistors to combine charging, protection and fuel gauge functions. The improved architecture can reduces battery system circuitry, eliminate one or more control loops, eliminate redundant voltage and sensing hardware and can reduce power path resistance to charge the battery faster, and to store and use more battery charge.

EXAMPLES AND ADDITIONAL NOTES

In Example 1, a battery pack having a first supply terminal and a second supply terminal can include a battery configured to supply power to a connected device and to receive re-charge power from a charger circuit, means for modulating current of the battery between the first supply terminal and the second supply terminal, and a controller configured to provide voltage protection of the battery pack and charge current control of the battery using the means for modulating current of the battery and wherein the controller is configured to provide charge voltage setpoint information to a connected device.

In Example 2, the controller of Example 1 optionally is configured to provide fuel gauge information of the battery.

In Example 3, the battery pack of any one or more of Examples 1-2 optionally includes a serial communication bus coupled to the controller and configured to couple to the connected device, wherein the controller is configured to provide the charge voltage setpoint information using the serial communication bus.

In Example 4, the means for modulating current of the battery of any one or more of Examples 1-3 optionally includes a transistor circuit coupled in series with the battery between the first supply terminal and the second supply terminal.

In Example 5, the transistor circuit of any one or more of Examples 1-4 optionally includes a first transistor and a second transistor, each transistor having a control terminal and first and second switch terminals, each control terminal coupled to an output of the controller.

In Example 6, the first transistor of any one or more of Examples 1-5 optionally is configured to control charge current to the battery.

In Example 7, the second transistor of any one or more of Examples 1-6 optionally is configured to control discharge current from the battery pack to the connected device.

In Example 8, the first transistor, second transistor and the battery of any one or more of Examples 1-7 optionally are coupled in series with each other between the first supply terminal and the second supply terminal.

In Example 9, the battery pack of any one or more of Examples 1-8 optionally includes a current sensor configured to provide current flow information to the controller.

In Example 10, the means for modulating current of the battery between the first supply terminal and the second supply terminal of any one or more of Examples 1-9 optionally includes a transistor coupled in series with the battery between the first supply terminal and the second supply terminal and the current sensor includes the transistor.

In Example 11, a method of operating a battery pack can include providing charge voltage setpoint information from a battery pack controller to a connected device, sampling a terminal voltage of the battery pack using the battery pack controller, sampling a terminal voltage of a battery using the battery pack controller, charging the battery using a current charging mode, wherein a charge current is controlled using a first transistor of the battery pack if a terminal voltage of the battery of the battery pack is below a first threshold, and updating and providing the charge voltage setpoint information to the connected device as the terminal voltage of the battery rises during the current charging mode.

In Example 12, the providing charge voltage setpoint information of any one or more of Examples 1-11 optionally includes communicating the charge voltage setpoint information from the battery pack controller to the connected device using a serial communication interface.

In Example 13, the providing charge voltage setpoint information of any one or more of Examples 1-12 optionally includes providing charge voltage setpoint information from the battery pack controller to a voltage converter of the connected device.

In Example 14, the providing charge voltage setpoint information of any one or more of Examples 1-13 optionally includes providing charge voltage setpoint information from the battery pack controller to a voltage converter of a battery charger.

In Example 15, the method of any one or more of Examples 1-14 optionally includes limiting charge current and limiting discharge current of the battery using a transistor circuit integrated with the battery pack.

In Example 16, the limiting the charge current of any one or more of Examples 1-15 optionally includes limiting the charge current using a first transistor of the transistor circuit.

In Example 17, the limiting the discharge current of any one or more of Examples 1-16 optionally includes limiting the discharge current using a second transistor of the transistor circuit.

In Example 18, the method of any one or more of Examples 1-17 optionally includes sampling current of the battery pack using a current sensor integrated with the battery pack, wherein the current sensor includes a transistor of the transistor circuit.

In Example 19, the method of any one or more of Examples 1-18 optionally includes charging the battery using a constant charge voltage when the terminal voltage of the battery of the battery pack is above the first threshold.

In Example 20, the method of any one or more of Examples 1-19 optionally includes sampling current of the battery pack using a current sensor integrated with the battery pack.

In Example 21, the method of any one or more of Examples 1-20 optionally includes providing fuel gauge information to the connected device using the controller.

In Example 22, the providing fuel gauge information of any one or more of Examples 1-21 optionally includes communicating the fuel gauge information from the battery pack controller to the connected device using a serial communication interface.

Example 23 can include, or can optionally be combined with any portion or combination of any portions of any one or more of Examples 1 through 22 to include, subject matter that can include means for performing any one or more of the functions of Examples 1 through 22, or a machine-readable medium including instructions that, when performed by a machine, cause the machine to perform any one or more of the functions of Examples 1 through 22.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A battery pack having a first supply terminal and a second supply terminal, the battery pack comprising:
   a battery configured to supply power to a connected device and to receive re-charge power from a charger circuit;
   a current modulating circuit configured to modulate current of the battery between the first supply terminal and the second supply terminal; and
   a controller configured to provide voltage protection of the battery pack and charge current control of the battery using the current modulating circuit, and wherein the controller is configured, while the battery is being charged, to:
      compare, at the battery pack, a charge voltage setpoint of the battery pack with a desired charging voltage;
      modify, at the battery pack, the charge voltage setpoint to achieve the desired charging voltage; and
      provide the modified charge voltage setpoint from the battery pack to a connected device.

2. The battery pack of claim 1, wherein the controller is configured to provide fuel gauge information of the battery.

3. The battery pack of claim 1, further comprising a serial communication bus coupled to the controller and configured to couple to the connected device, wherein the controller is configured to provide the charge voltage setpoint and the modified charge voltage setpoint using the serial communication bus.

4. The battery pack of claim 1, wherein the current modulating circuit includes a transistor circuit coupled in series with the battery between the first supply terminal and the second supply terminal.

5. The battery pack of claim 4, wherein the transistor circuit includes a first transistor and a second transistor, each transistor having a control terminal and first and second switch terminals, each control terminal coupled to an output of the controller.

6. The battery pack of claim 5, wherein the first transistor is configured to control a charge current to the battery.

7. The battery pack of claim 5, wherein the second transistor is configured to control a discharge current from the battery pack to the connected device.

8. The battery pack of claim 5, wherein the first transistor, the second transistor and the battery are coupled in series with each other between the first supply terminal and the second supply terminal.

9. The battery pack of claim 1, further comprising a current sensor configured to provide current flow information to the controller.

10. The battery pack of claim 9, wherein the current modulating circuit includes a transistor coupled in series with the battery between the first supply terminal and the second supply terminal; and
wherein the current sensor includes the transistor.

11. A method of operating a battery pack, the method comprising:
providing a charge voltage setpoint from a controller included in a battery pack to a connected device;
sampling a terminal voltage of the battery pack using the controller;
sampling a terminal voltage of a battery using the controller; and
charging the battery using a current charging mode, wherein a charge current is controlled using a first transistor of the battery pack if a terminal voltage of the battery of the battery pack is below a first threshold, the charging the battery including:
comparing, by the controller at the battery pack, the charge voltage setpoint with a desired charging voltage of the battery pack;
modifying, by the controller at the battery pack, the charge voltage setpoint to achieve the desired charging voltage; and
providing, by controller, the modified charge voltage setpoint from the battery pack to a connected device.

12. The method of claim 11, wherein the providing the charge voltage setpoint and the modified charge voltage setpoint includes communicating charge voltage setpoint information from the controller to the connected device using a serial communication interface included in the battery pack.

13. The method of claim 11, wherein the providing the charge voltage setpoint and the modified charge voltage setpoint includes providing charge voltage setpoint information from the controller to a voltage converter of the connected device.

14. The method of claim 11, wherein the providing the charge voltage setpoint and the modified charge voltage setpoint includes providing charge voltage setpoint information from the controller to a voltage converter of a battery charger.

15. The method of claim 11, further comprising limiting the charge current and limiting a discharge current of the battery using a transistor circuit integrated with the battery pack.

16. The method of claim 15, wherein the limiting the charge current includes limiting the charge current using a first transistor of the transistor circuit.

17. The method of claim 15, wherein the limiting the discharge current includes limiting the discharge current using a second transistor of the transistor circuit.

18. The method of claim 15, further comprising sampling a current of the battery pack using a current sensor integrated with the battery pack, wherein the current sensor includes a transistor of the transistor circuit.

19. The method of claim 11, further comprising charging the battery using a constant charge voltage when the terminal voltage of the battery of the battery pack is above the first threshold.

20. The method of claim 11, further comprising sampling a current of the battery pack using a current sensor integrated with the battery pack.

21. The method of claim 11, further comprising providing fuel gauge information to the connected device using the controller.

22. The method of claim 21, wherein the providing the fuel gauge information includes communicating the fuel gauge information from the controller to the connected device using a serial communication interface.

* * * * *